(12) United States Patent
Wood

(10) Patent No.: US 6,848,655 B2
(45) Date of Patent: Feb. 1, 2005

(54) FRAMELESS AIRCRAFT CANOPY ACTUATION SYSTEM AND METHOD

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/367,404

(22) Filed: Feb. 13, 2003

(65) Prior Publication Data

US 2004/0159746 A1 Aug. 19, 2004

(51) Int. Cl.$^7$ ................................................ B64C 1/10
(52) U.S. Cl. .................. 244/121; 244/129.3; 244/129.4
(58) Field of Search .............................. 244/121, 129.3, 244/129.4, 129.5; 403/408.1; 411/84, 903, 82, 180

(56) References Cited

U.S. PATENT DOCUMENTS

| | | |
|---|---|---|
| 451 A | 11/1837 | Salsbury, Jr. |
| 2,258,724 A | 4/1938 | Wagner et al. |
| 2,511,168 A | 3/1946 | Martin et al. |
| 3,618,881 A | 11/1971 | Fellers et al. |
| 4,004,388 A | 1/1977 | Stefanik |
| 4,580,745 A | 4/1986 | Brophy |
| 4,823,229 A * | 4/1989 | Waterland, III ............. 361/218 |
| 4,964,594 A * | 10/1990 | Webb .......................... 244/131 |
| 5,085,383 A | 2/1992 | Larkin et al. |
| 5,277,384 A * | 1/1994 | Webb ....................... 244/129.3 |

* cited by examiner

*Primary Examiner*—Teri P. Luu
*Assistant Examiner*—T. Nguyen
(74) *Attorney, Agent, or Firm*—Black Lowe & Graham PLLC

(57) ABSTRACT

An apparatus and method for attaching an injection-molded canopy to a hinge assembly is provided. The apparatus includes attachment components that are at least partially embedded in the injection-molded canopy. A hinge assembly attaches to the attachment components for controlling the position of the canopy. The canopy is a polycarbonate or acrylic frameless canopy. The hinge assembly is hingedly attached to the vehicle. The hinge assembly includes a center support and port and starboard supports. The center support is located approximately along a centerline of the canopy, the port support is located on a port side of the vehicle, and the starboard support is located on a starboard side of the vehicle.

15 Claims, 3 Drawing Sheets

FIG. 4.
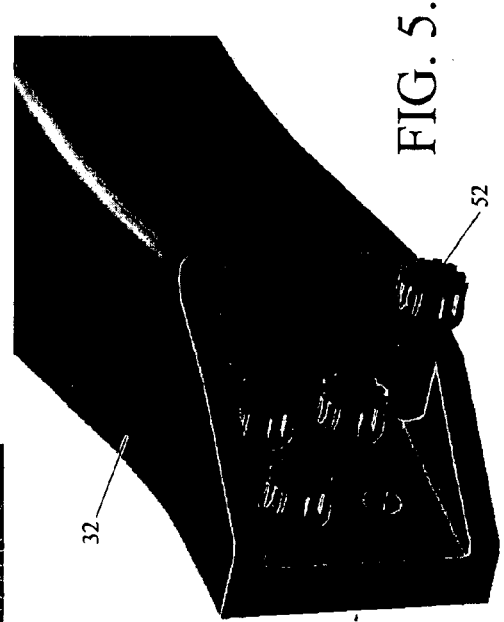
FIG. 5.
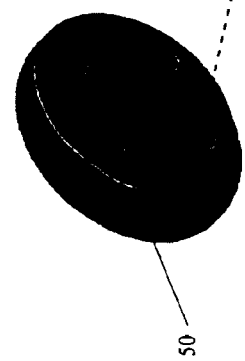

FRAMELESS AIRCRAFT CANOPY ACTUATION SYSTEM AND METHOD

RELATED APPLICATIONS

This invention relates to copending U.S. patent application Ser. No. 10/366,949, filed Feb. 13, 2003, U.S. patent application Ser. No. 10,367,024, filed Feb. 13, 2003, U.S. patent application Ser. No. 10/367,064, filed Feb. 13, 2003, U.S. patent application Ser. No. 10/367,403, filed Feb. 13, 2003, and U.S. patent application Ser. No. 10/367,062, filed Feb. 13, 2003, all of which are hereby incorporated by reference.

GOVERNMENT LICENSE RIGHTS

This invention was made with Government support under U.S. Government contract F33615-97-2-3407 awarded by U.S. Air Force. The Government has certain rights in this invention.

FIELD OF THE INVENTION

This invention relates generally to canopies and, more specifically, to attachment mechanisms for frameless canopies.

BACKGROUND OF THE INVENTION

Modern aircraft canopies contain many parts. A transparent portion of the canopy may be replaced several times during the life of an aircraft due to scratches and general deterioration. Replacement of the transparent portion entails frame disassembly and reassembly. This is time-consuming, labor intensive, and costly.

Attempts have been made to produce frameless aircraft canopies in order to reduce parts and simplify replacement of the transparent portion, among other reasons. However, viable frameless canopy systems must include a method for actuation. As is known, the frame provides structural stiffness and strong, secure, attachment points for actuation hinges and latches.

There exists an unmet need to produce an actuation system for an injection-molded canopy which has no frame from which to secure a hinging system from.

SUMMARY OF THE INVENTION

The present invention is an actuation apparatus for a canopy that has no frame. The present invention provides an apparatus and method for attaching an injection-molded canopy to a hinge assembly. The apparatus includes attachment components that are at least partially embedded in the injection-molded canopy. A hinge assembly attaches to the attachment components for controlling the position of the canopy. The canopy is a polycarbonate or acrylic frameless canopy. The hinge assembly is hingedly attached to the vehicle.

In one aspect of the present invention, the hinge assembly includes a center support and port and starboard supports. The center support is located approximately along a centerline of the canopy, the port support is located on a port side of the vehicle, and the starboard support is located on a starboard side of the vehicle.

BRIEF DESCRIPTION OF THE DRAWINGS

The preferred and alternative embodiments of the present invention are described in detail below with reference to the following drawings.

FIGS. 4 and 5 illustrate perspective views of attachment mechanisms for the canopy and side supports of the hinge assembly.

DETAILED DESCRIPTION OF THE INVENTION

Figure 1:
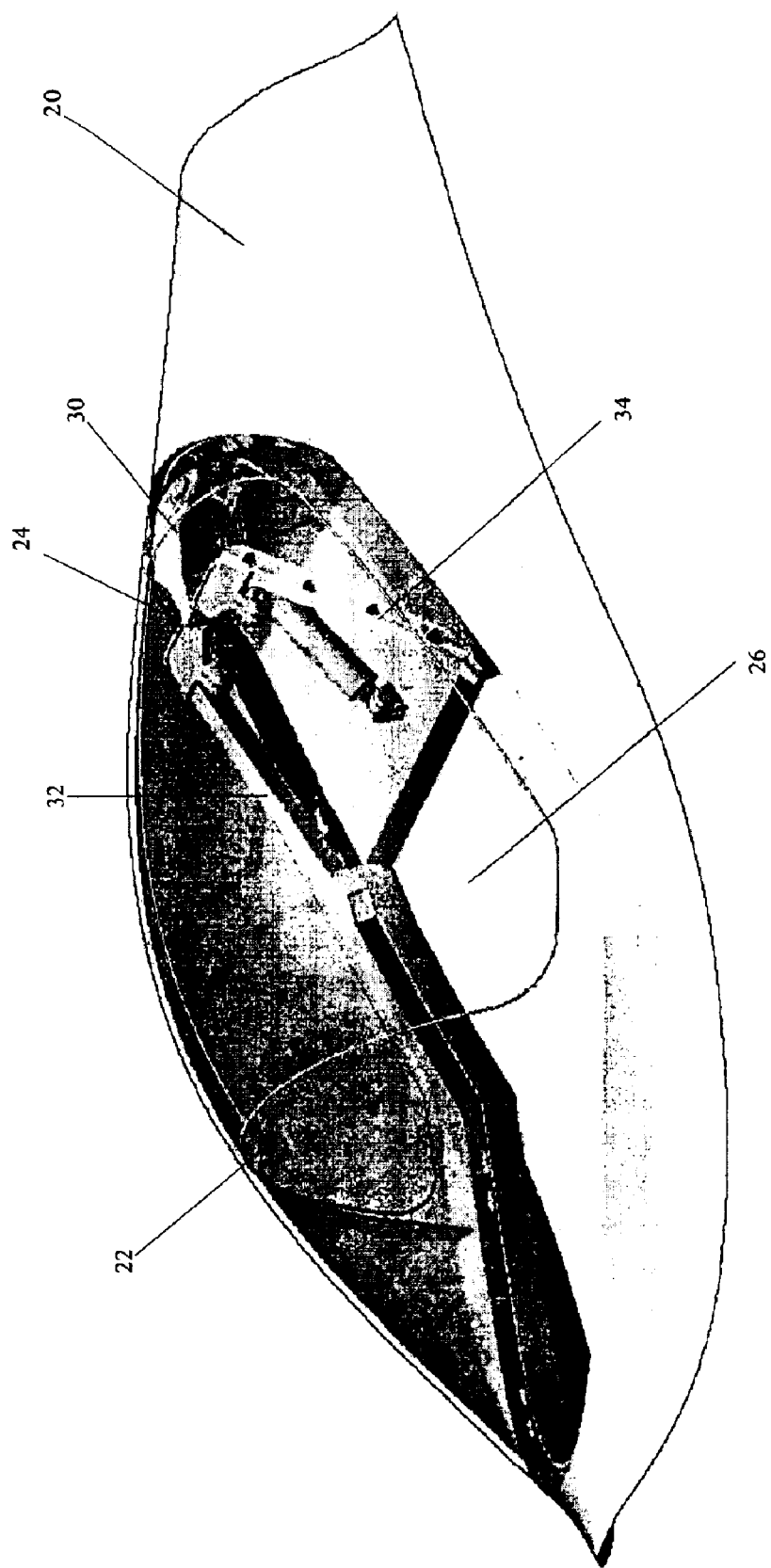
FIG. 1 illustrates a perspective view of a frameless canopy attached to an aircraft in accordance with the present invention.

The present invention is an injection-molded canopy with imbedded attachment components for attaching to a hinge assembly. Non-limiting examples of injection-molded canopies include polycarbonate and acrylic frameless canopies. FIG. 1 illustrates an aircraft fuselage 20 with an exemplary injection-molded frameless canopy 22 that covers a cockpit 26. The injected-molded frameless canopy 22 is opened and closed about the cockpit 26 by an electro-mechanically or hydraulically operated canopy hinge assembly 24. The canopy hinge assembly 24 is attached within the cockpit 26 and to the canopy 22 at one or more connection points. In one embodiment, the canopy hinge assembly 24 includes an aft support 30 and starboard and port supports 32 and 34. The aft support 30 and the starboard and port supports 32 and 34 are attached at one or more points on the canopy 22.

Figures 2, 3:
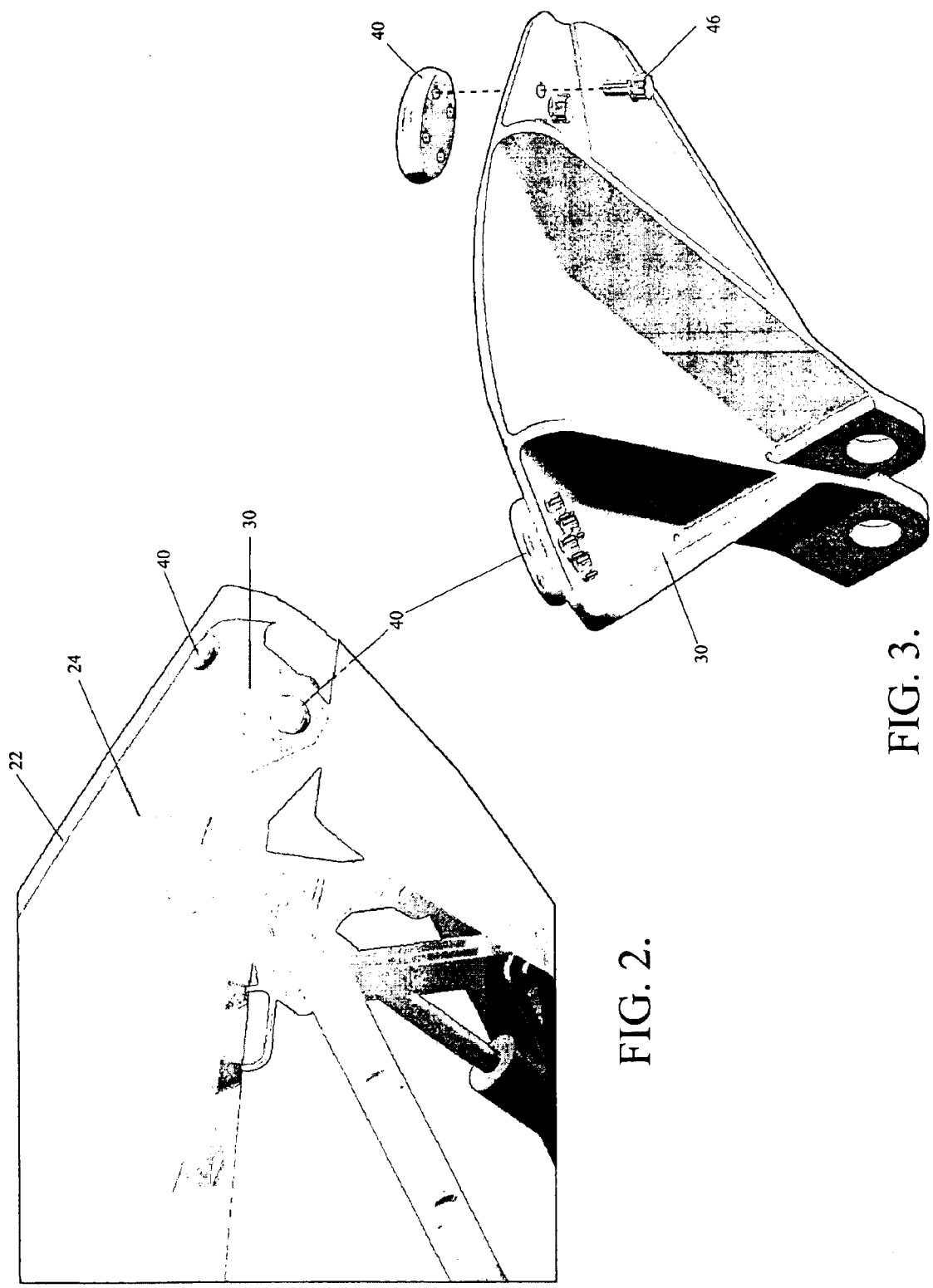
FIGS. 2 and 3 illustrate attachment mechanisms for an aft fitting for the canopy and a hinge assembly.

FIG. 2 illustrates a top down perspective view of the connection between the aft support 30 and the canopy 22. The canopy 22 is formed in an injection mold. One or more securing plates 40 are inserted into the injection mold so that the plates 40 are securely held in place within the molded canopy 22. The plates 40 are suitably disc shaped with a face that suitably includes one or more threaded holes. The diameter of the plates 40 increases behind the face. The securing plates 40 are positioned within the canopy so that the face is approximately flush with an interior surface of the canopy 22 and the rest of the plates 40 are surrounded by canopy material.

FIG. 3 illustrates a bottom perspective view of the aft support 30 and the securing plates 40. The aft support 30 includes holes for receiving one or more fasteners 46. The fasteners 46 pass through the holes on the aft support 30 and into the threaded holes in the securing plates 40 for securely attaching the support 30 to the canopy 22. It can be appreciated that the aft support 30 can be attached to the plates 40 by various fastening devices, such as without limitation bolts or screws.

FIG. 4 illustrates a perspective view of the starboard support 32 attached to the canopy 22. Arm securing plates 50 are inserted into the canopy 22 during the molding process. The plates 50 are similar to the securing plates 40. The arm securing plates 50 are located on interior sides of the canopy 22. As shown in FIG. 5, the arm securing plates 50 include holes with interior threads for receiving one or more fasteners 52 that pass through holes at ends of each of the starboard and port supports 32 and 34. The fasteners 52 securely attach each of the supports 32 and 34 to the respective arm securing plates 50 without causing significant contact of the respective supports 32 and 34 with the canopy 22.

In one embodiment, bushings (not shown) are placed between the supports 30, 32, and 34 and the plates 40 and 50 for reducing wear between the parts. Also, bushings (not shown) are placed between the supports 30, 32, and 34 and the canopy 22 around the connections to the plates 40 and 50, thereby reducing wear on the canopy 22.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A canopy system for an aircraft having a cockpit, the system comprising:
    an injection-molded canopy;
    at least one component fully embedded in the injection-molded canopy;
    a hinge assembly; and
    at least one fastener for attaching the hinge assembly to the at least one component,
    wherein the canopy closes around the cockpit of the aircraft and the hinge assembly is hingedly attached within the cockpit,
    wherein the hinge assembly includes a center support and port and starboard supports, the center support is located approximately along a centerline of the canopy, the port support is located on a port side of the aircraft, and the starboard support is located on a starboard side of the aircraft.

2. The system of claim 1, wherein the canopy is molded around the one or more components.

3. The system of claim 1, wherein the canopy is molded from at least one of polycarbonate or acrylic-based materials.

4. The system of claim 1, wherein the hinge assembly is hingedly attached to the vehicle.

5. The system of claim 1, wherein the injection-molded canopy is frameless.

6. An injection-molded canopy for a vehicle, the canopy comprising:
    one or more attachment components for receiving fasteners for attaching a hinge assembly,
    wherein the one or more attachment components are fully embedded in the injection-molded canopy,
    wherein the one or more attachment components includes a center component and port and starboard components, wherein the center component is located approximately along a centerline of the canopy, the port component is located on a port side of the canopy, and the starboard component is located on a starboard side of the canopy.

7. The canopy of claim 6, wherein the canopy is molded around the attachment apparatus.

8. The canopy of claim 6, wherein the canopy is molded from at least one of polycarbonate or acrylic-based materials.

9. The canopy of claim 6, wherein the vehicle is an aircraft.

10. The canopy of claim 6, wherein the injection-molded canopy is frameless.

11. A method for attaching a canopy to a vehicle, the method comprising:
    injection-molding a canopy around one or more attachment components, wherein the attachment components being fully embedded in the injection-molded canopy;
    attaching a hinge assembly to the attachment components; and
    hingedly attaching the attached hinge assembly to the vehicle,
    wherein the hinge assembly includes a center support and port and starboard supports, wherein the center support is located approximately along a centerline of the canopy, the port support is located on a port side of the vehicle, and the starboard support is located on a starboard side of the vehicle.

12. The method of claim 11, wherein the canopy is molded from at least one of polycarbonate or acrylic-based materials.

13. The method of claim 11, wherein the vehicle is an aircraft.

14. The method of claim 11, further comprising providing fasteners for attaching the supports to the attachment components.

15. The method of claim 11, wherein the injection-molded canopy is frameless.

* * * * *